Figure 1:
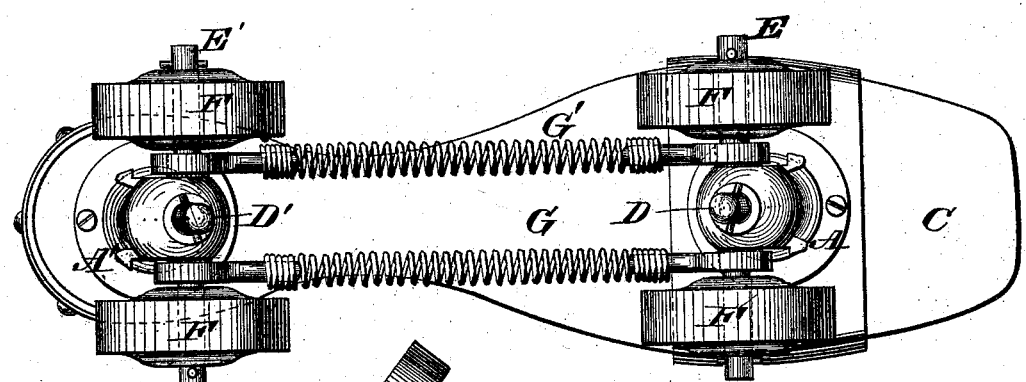

2 Sheets—Sheet 1.

G. RUSH, Jr.
Roller-Skate.

No. 211,111.  Patented Jan. 7, 1879.

Witnesses:
P. H. Dietrich.
Frank H. Duffy.

Inventor:
George Rush Jr.
by L. Lloyd Wiegand
Attorney

2 Sheets—Sheet 2.

G. RUSH, Jr.
Roller-Skate.

No. 211,111.        Patented Jan. 7, 1879.

Witnesses:                    Inventor:

UNITED STATES PATENT OFFICE.

GEORGE RUSH, JR., OF PHILADELPHIA, PENNSYLVANIA.

IMPROVEMENT IN ROLLER-SKATES.

Specification forming part of Letters Patent No. 211,111, dated January 7, 1879; application filed February 26, 1878.

*To all whom it may concern:*

Be it known that I, GEORGE RUSH, Jr., of the city and county of Philadelphia, and State of Pennsylvania, have invented a new and useful Improvement in Roller-Skates; and I do hereby declare the following to be a sufficiently full, clear, and exact description thereof to enable others skilled in the art to make and use the said invention.

The nature of my invention consists in the combination, with the body of a skate, of two pivot or journal bearings, so formed upon or attached to clamps adapted to be readily applied to and securely fastened on either a skate-runner or roller-skate sole that when thus fastened the axes of such journals shall be not parallel, but inclined toward each other, and when the sole is horizontal the axes shall be in a vertical plane. Upon each of the pivots or journals is placed an axle, bearing wheels near each end, and the two axles are coupled together by means of an elastic link or links, so that when the wheels roll in a curve both axles turn upon their pivots. This motion is restricted by an adjustment in the tension of the elastic links.

I will now proceed to describe more particularly the manner of making and using my invention, referring in so doing to the drawing annexed and the letters of reference marked thereon, the same letters applying to the same parts in the several figures.

Figure 2:
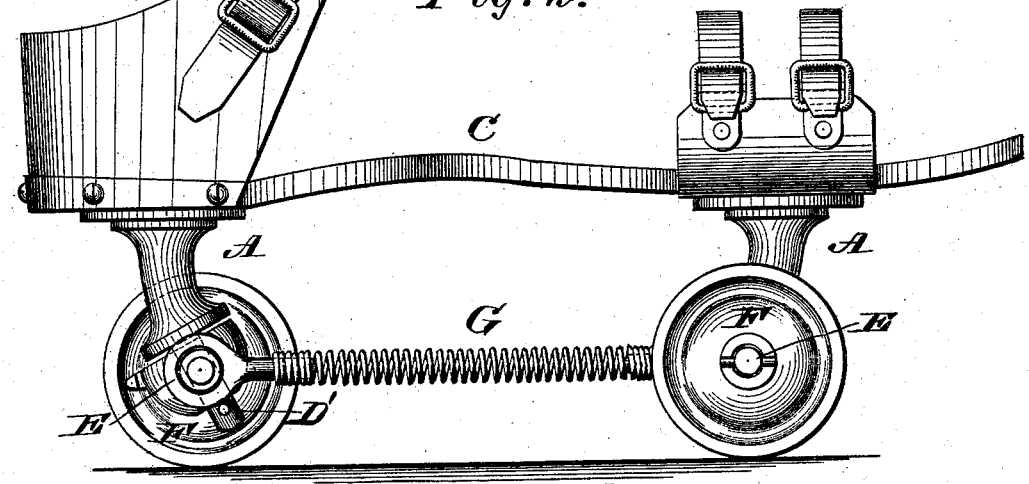
Figure 3:
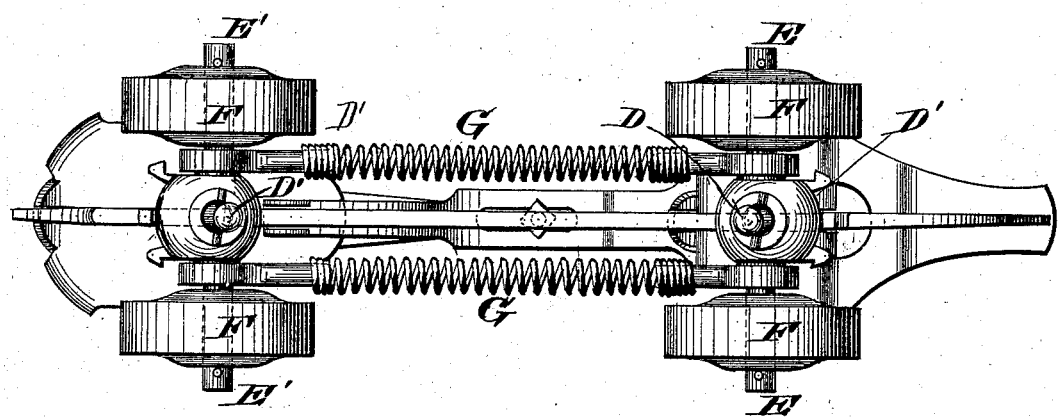
Figure 4:
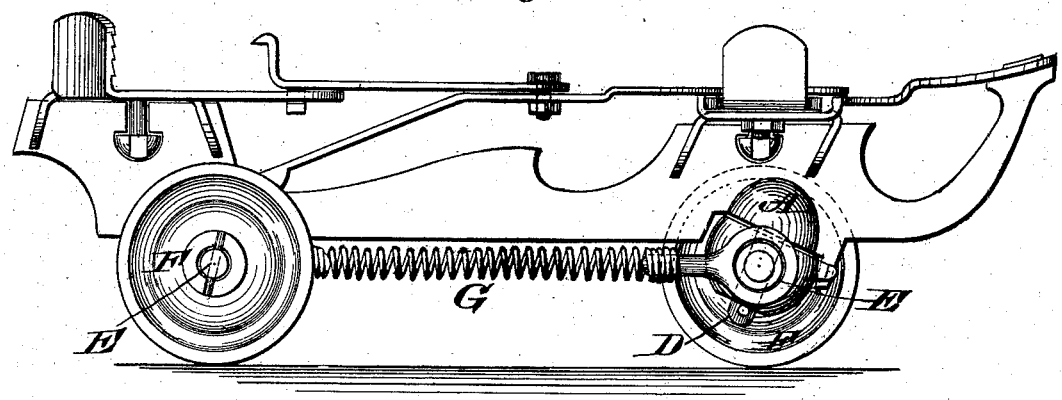

Figure 1 is an inverted plan. Fig. 2 is a side elevation with one wheel removed. Figs. 3 and 4 show modifications.

A and A' represent bearings adapted to fit on the sole of a skate, C, which may be of metal, wood, vulcanized rubber, celluloid, vulcanized fiber, or other rigid light substances, those having slow conducting properties being preferable. D and D' are journals or pivots in the same vertical plane extending obliquely downward from the bearings A and A', passing through and turning freely in the axles E and E'. F F F and F are wheels or rollers, turning freely upon the axles E and E'.

The axles E and E' are connected by links G and G', which are parallel with each other, as shown in Fig. 1, and attached to the axles E and E' at points between the wheels. Their function is to cause the axles E and E' to turn simultaneously on the pivots D and D' to a parallel position.

When the wheels rest upon a surface at right angles to the plane of the axes of the pivots D and D', the axles E and E' remain parallel. When the pivots are inclined either to the right or left, the axles are inclined to each other. By means of this action of the oblique pivots upon the axles the wearer is able to control the adjustment of the axles to each other, and cause the skate to either roll in right lines or curves in either direction, and of radii determined by the degree of inclination of the sole to the floor upon which the skate rolls.

I do not broadly claim roller-skates having the roller-axles attached to the soles by journals having oblique or inclined axes, such skates having been already used with such inclined journals supported on both sides of the axles; but, Having described my invention and its mode of operation, what I claim as new therein is—

In a roller-skate having bearings rigidly attached to the sole, oblique journals projecting downward therefrom, wheels and axles, and the longitudinally-elastic links G G', combined and arranged substantially as shown, for the purpose set forth.

GEO. RUSH, JR.

Witnesses:
J. DANIEL EBY,
E. H. GRAHAM.